United States Patent [19]

Bayens

[11] Patent Number: 4,625,592

[45] Date of Patent: Dec. 2, 1986

[54] DIE FOR CUTTING PAPER, CLOTH AND THE LIKE AND METHOD OF MAKING SAME

[76] Inventor: Harold J. Bayens, 110 Meadowbrook Country Club, Ballwin, Mo. 63011

[21] Appl. No.: 698,763

[22] Filed: Feb. 6, 1985

[51] Int. Cl.⁴ .............................................. C22B 3/02
[52] U.S. Cl. ................................................ 76/107 C
[58] Field of Search .............. 76/107 R, 107 C, 101 R

[56] References Cited

U.S. PATENT DOCUMENTS

| 922,926 | 5/1909 | Lynch | 76/107 C |
| 1,160,179 | 11/1915 | Lynch | 76/107 C |
| 3,872,744 | 3/1975 | Fauth | 76/107 C |

*Primary Examiner*—Roscoe V. Parker

*Attorney, Agent, or Firm*—Cohn, Powell & Hind

[57] ABSTRACT

A die for repetitively cutting shapes out of material such as paper and cloth includes a continuous, seamless metal wall defining a central opening having a predetermined shape substantially the same as a shape it is desired to cut. A cutting surface is disposed at the top of the metal wall, the cutting surface defining the outline of the shape it is desired to cut. Such dies are formed by cutting a die blank out of a block of metal, the outline of the die blank corresponding generally to the shape it is desired to cut. At least part of the interior of the die blank is removed to form a modified die blank with a central opening having substantially the same shape as the shape it is desired to cut. A cutting edge is formed on one surface of the modified die blank adjacent the central opening by electric discharge machining.

12 Claims, 25 Drawing Figures

DIE FOR CUTTING PAPER, CLOTH AND THE LIKE AND METHOD OF MAKING SAME

BACKGROUND OF THE INVENTION

This invention relates to the cutting of predetermined shapes from material such as paper and cloth, and more particularly to an improved method of making a die for cutting such materials and such a die.

Metal dies are used to cut paper and cloth products such as labels, envelopes and other useful objects of predetermined shapes. Conventionally, the making of a die for such a purpose has been time consuming, expensive and labor intensive. For example, the making of an envelope die required some twenty steps. First, a metal template was made from a pattern which represented the planned cutting edge of the die being made. Using the metal template, a forger measured on a bar of rolled steel some 15/32 of an inch thick the length of steel required to make the finished die. When the proper length had been determined an additional two inches was added to serve as a holding point of the steel during forging. The bar was then cut to length. The steel bar was then heated to a red hot stage and the forger then pounded the steel bar into the designated shape using the metal template to obtain the proper shape. When all the features of the pattern had been forged, the "extra" two inch holding piece of steel was sheared off. The two ends of the die at this point were approximately ¼ of an inch apart. A welder was then used to weld the die together thereby closing up the exterior of the die and leaving an interior opening through the die. After the die cooled, the excess weld was buzzed out with a router and a grinding buzzer. The die then had to be returned to the forger to remove any distortions which occurred due to the welding heat. During this step, the die was pounded back into shape in conformance to the metal template. Thereafter the die was annealed to bring the die into the proper hardness range. A surface grinder was then used to grind the top and bottom surface of the die level. After the surface grinding, the forger would again check the die to make sure that it was still in accordance with the metal template. The cutting edge of the die was then roughed in by machine and then hand filed and grinder buzzers were then used to grind the desired angle of the cutting edge or surface of the die. A stone wheel grinder was then used to remove all excess steel from the outside of the die and the die was then heat treated and placed into the salt draw. Again, the die was checked with the metal template to make sure it was still of the proper shape. All corners and angles of the metal die were then trued up and a surface grinder was used to grind the die to the proper height. A disc side grinder was then used to grind any additional excess metal from the outside and to blend in the appropriate "roll" from the side to the beveled cutting edge. The die was then sand blasted for a smoother finish and hand filed to a sharp cutting edge. As the final two steps, the die was polished and sprayed with a preservative. This process took roughly three man days of labor and required highly skilled artisans. The process for making label dies was similar. Such processes, particularly the heat bending and milling steps, are believed to have introduced a great deal of strain into the finished die. It has also conventionally been the case that label dies have an inclined outer surface, with the angle of inclination being about eight degrees (8°) with the respect to the longitudinal axis of the die. It is believed that increasing this outside angle could improve the cutting characteristics of the die, but such greater angles are not believed to have been achievable using a process such as the one described above.

SUMMARY OF THE INVENTION

Among the various aspects and features of the present invention may be noted the provision of a die for cutting materials such as paper and cloth with improved cutting characteristics; the provision of such a die with improved life; the provision of a method for making such a die which is less time consuming; the provision of such a method which is less expensive; and the provision of such a method which requires less skilled labor. Other aspects will be in part apparent and in part pointed out hereinafter.

Briefly, a die of the present invention for repetitively cutting predetermined shapes out of paper, cloth and the like includes a continuous, seamless metal wall defining a central opening having a predetermined shape substantially the same as a shape it is desired to cut. A cutting surface is disposed at the top of the metal wall, the cutting surface defining the outline of the shape it is desired to cut.

The method of the present invention includes the steps of cutting a die blank out of a block of metal, the outline of the die blank corresponding generally to the shape it is desired to cut. At least part of the interior of the die blank is removed to form a modified die blank with the central opening having subtantially the same shape as the shape it is desired to cut. A cutting edge is formed on one surface of the modified die blank adjacent the central opening.

BRIEF DESCRIPTION OF THE DRAWINGS

FIG. 14 is a section taken generally along line 14—14 of

FIG. 13 illustrating the milling of the interior of the die blanks;

Similar reference characters indicate similar parts throughout the several views of the drawings.

Figure 1:
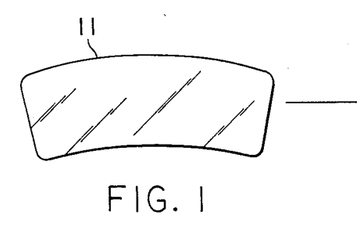
FIG. 1 is a plan of a pattern for a label die of the present invention.
Figure 2:
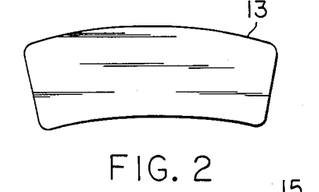
FIG. 2 is a plan of a metal template for the label die of the present invention.
Figure 3:
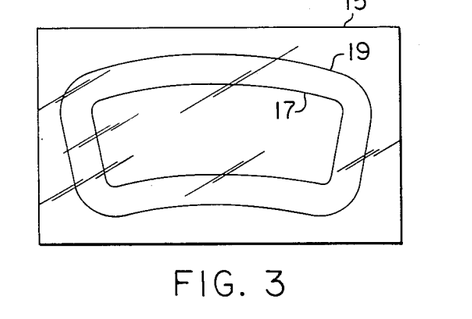
FIG. 3 is a plan of a pattern drawn from the metal template of FIG. 2 showing the desired inside and outside walls of the die.
Figure 4:
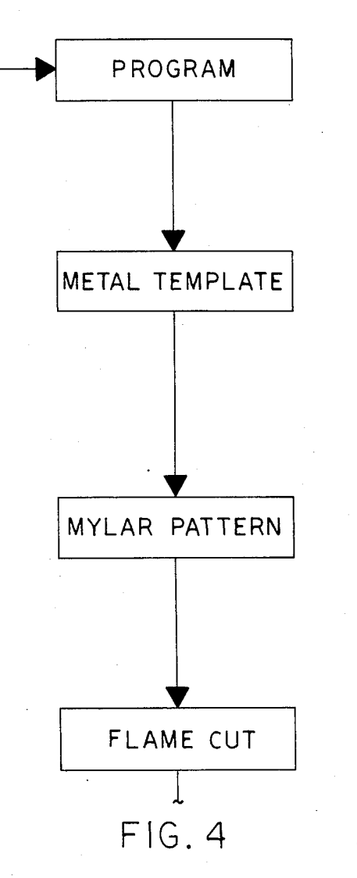
FIG. 4, 4A and 4B are a single flow chart for the method of the present invention.
Figure 4A:
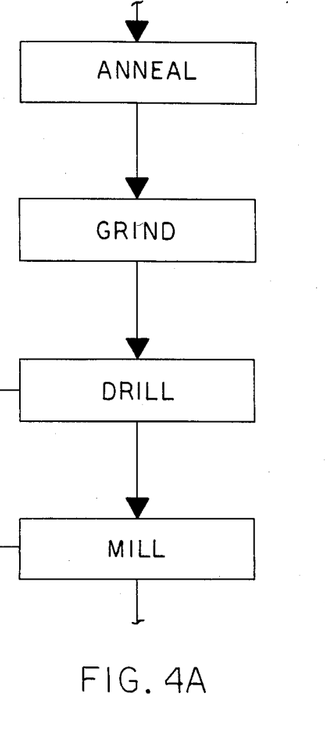
Figure 5:
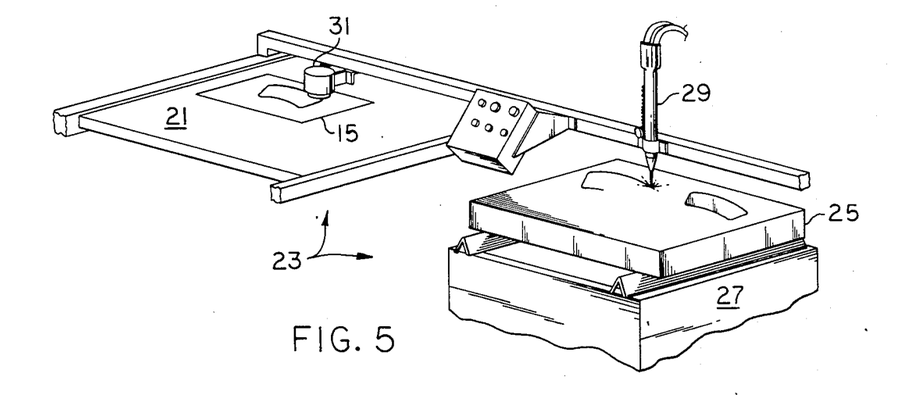
FIG. 5 is a perspective showing the use of the pattern of FIG. 3 in cutting out a label die blank of the present invention.

DESCRIPTION OF THE PREFERRED EMBODIMENTS:

A pattern 11 (FIG. 1) is used to develop the label die of the present invention. More particularly, pattern 11 represents the cutting surface that is desired for the label die. This pattern is measured and digitized using any of a number of conventional systems for digitizing such patterns. The digitized pattern is then used to develop a complete machining program (the first box of FIG. 4) for both the milling machine and the electrical discharge machine discussed below. Any of a number of conventional computer systems are capable of taking this sort of input and generating the tape output for such numerically controlled machines. A metal template 13 (FIG. 2) is then made of the die cutting edge using the tool path pattern produced by the computer discussed above (not shown). The metal template is then used to draw a pattern on a suitable transparent plastic such as that sold by DuPont under the trade designation mylar. Such a pattern is labelled 15 (FIG. 3) and indicates the inside wall 17 and outside wall 19 of the desired label die. This pattern on mylar thus details the wall thickness of the die. As shown in FIG. 5, mylar pattern 15 is then placed upon a plotting table 21 which is part of a flame cutting system 23 of conventional design. A block 25 of suitable metal such as four inch thick, stress relieved number 4140 steel is suitably mounted on a table 27 above which is mounted a cutting torch 29. System 23 uses an electric eye 31 to follow the outside of the mylar pattern 15 to cause torch 27 to cut through block 25 and form a blank 31 for the label die. In FIG. 5 one such blank has already been cut out of block 25 and a second is in the process of being cut.

Figure 6:
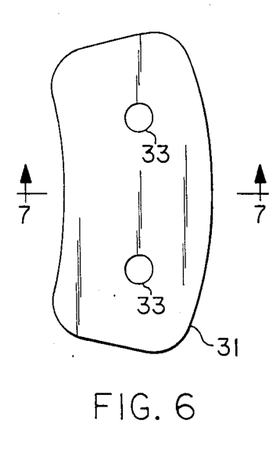
FIG. 6 is a plan of the label die blank of the present invention.
Figure 7:
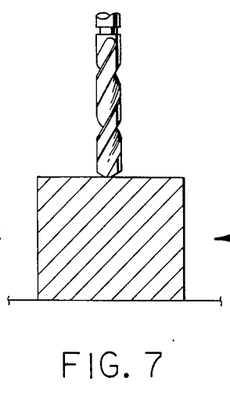
FIG. 7 is a section taken generally along line 7—7 of FIG. 6 illustrating the drilling of two securing holes in the die blank.
Figure 8:
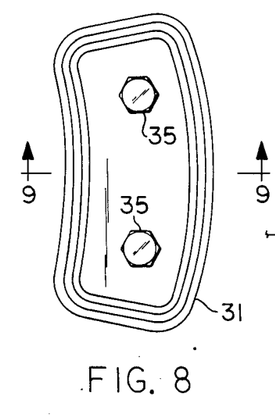
FIG. 8 is a plan illustrating the die blank of FIG. 6 after the exterior surface of the die blank has been milled in a step-wise fashion.
Figure 9:
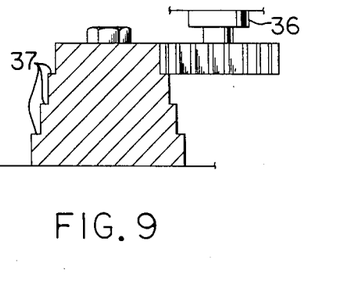
FIG. 9 is a section taken generally along line 9—9 of FIG. 8 illustrating the milling of the stepped outer surface of the die blank of FIG. 8.
Figure 10:
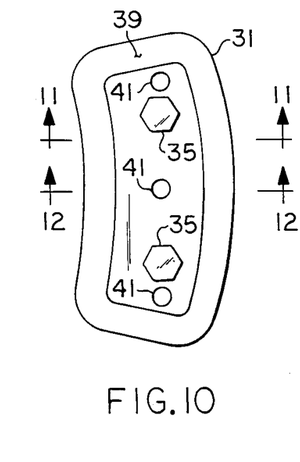
FIG. 10 is a plan of the label die blank of FIG. 8 with the stepped surfaces milled smooth at an incline.
Figure 11:
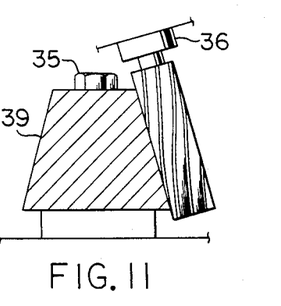
FIG. 11 is a section taken generally along line 11—11 of FIG. 10 illustrating the milling of the inclined surface.
Figure 12:
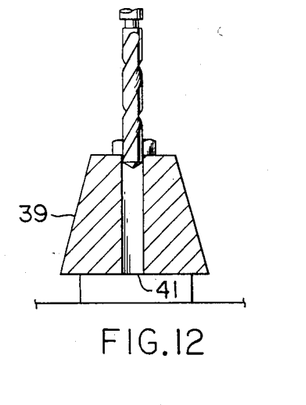
FIG. 12 is a section taken generally along line 12—12 of FIG. 10 illustrating the drilling of one of three central line positioning holes in the die blank of FIG. 10.

After being removed from block 25, die blank 31 is annealed and ground in conventional manner to relieve stress and smooth the outside surface of the die blank somewhat. A pair of mounting holes 33 (FIG. 6) are then drilled in blank 31 by pecdrill, such as illustrated in FIG. 7. These holes are provided so that a pair of bolts 35 (FIG. 8) may be used to hold the blank stationary while a milling machine 36 mills a series of steps 37 in the exterior surface of blank 31 as shown in FIG. 9. After steps 37 are milled into the blank, the steps are milled off to form a smoothly inclined surface 39 along the ouside of blank 31 (see FIGS. 10 and 11). A series of three alignment holes 41 are then drilled in blank 31 by a pecdrill as shown in FIG. 12. These three alignment holes are disposed along a single line which acts as a reference for the electrical discharge machine described below.

Figure 13:
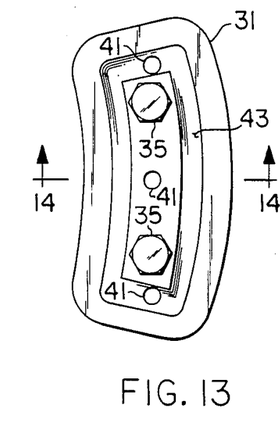
FIG. 13 is bottom plan of the label die blank of the present invention showing a portion of the interior of the die blank after it has been milled out.
Figure 14:
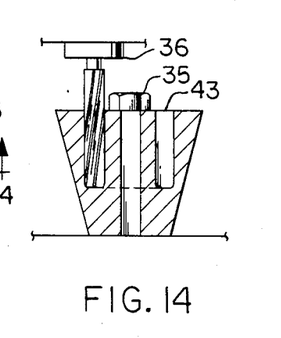

After the drilling of the alignment holes, blank 31 is turned over as shown in FIG. 13 and a groove 43 is milled in the bottom of blank 31. Groove 43 generally follows the outline of blank 31 and extends into the blank a distance somewhat over half of the thickness of blank 31. This groove is designed to reduce the amount of material which must be removed by the electrical discharge machining process described below. After milling, die blank 31 is heat treated and sand blasted in a conventional manner.

Figures 15, 16, 17:
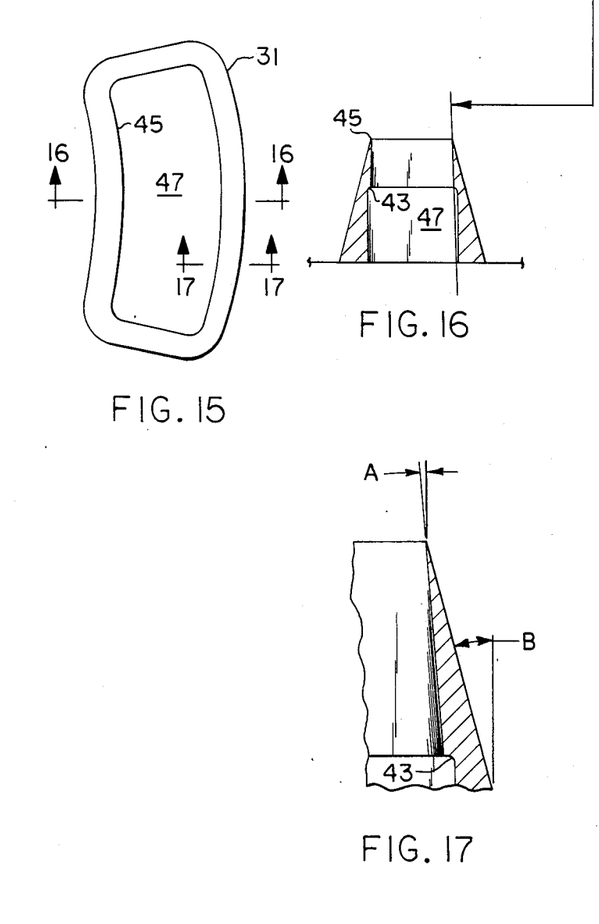
FIG. 15 is a top plan of the label die blank of FIG. 13 after the interior of the die blank has been removed.
FIG. 16 is a section taken generally along line 16—16 of FIG. 15 illustrating the process by which the interior of the die blank is removed.
FIG. 17 is a section on an enlarged scale taken generally along line 17—17 of FIG. 15 illustrating the geometry of the cutting surface of the envelope die of the present invention.
Figure 18:
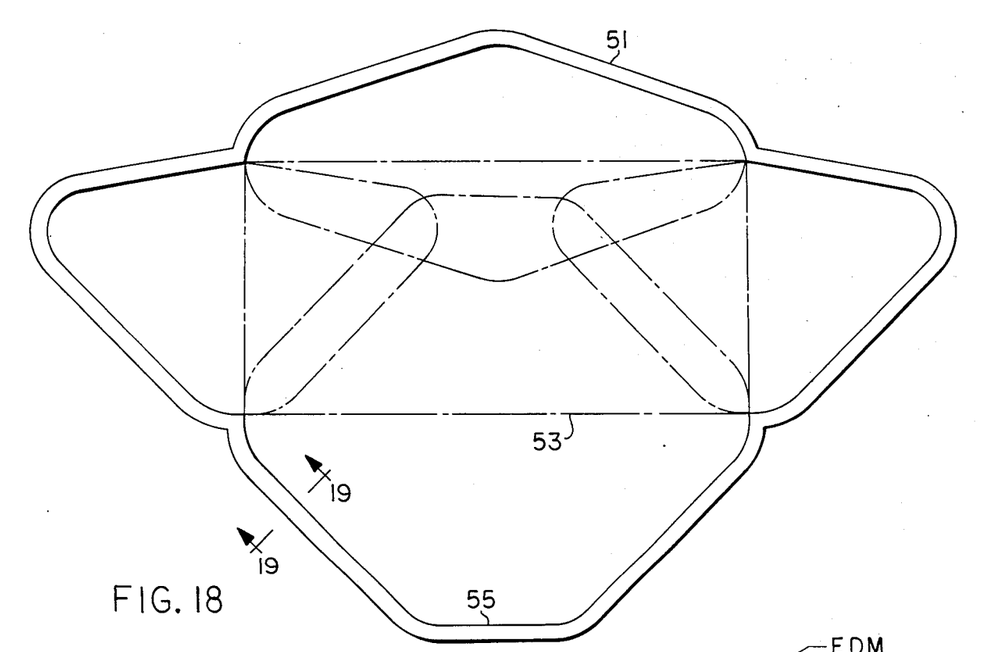
FIG. 18 is a top plan of a die blank for an envelope die of the present invention.
Figure 23:
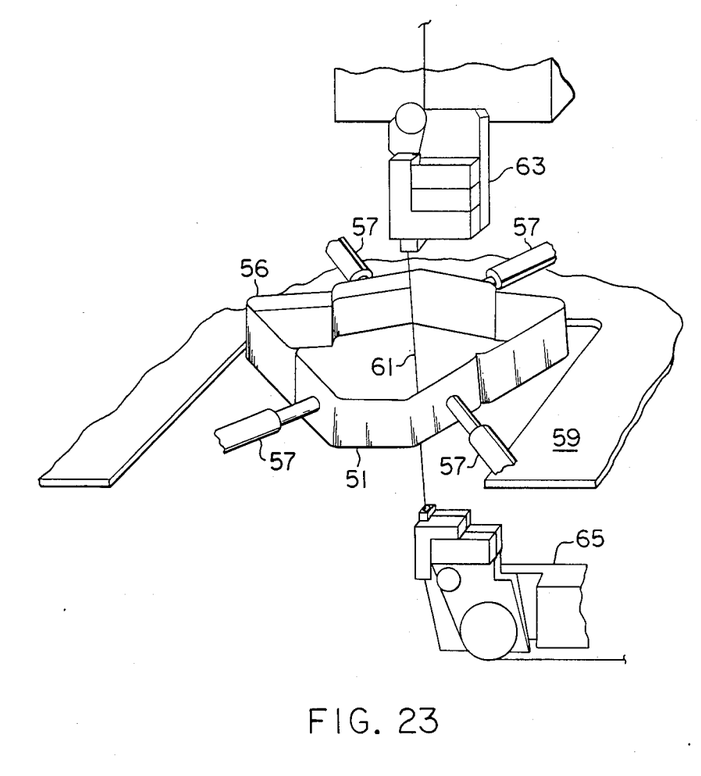
FIG. 23 is a perspective view of a die having the cutting edge formed by electrical discharge machining.

After sandblasting, die blank 31 is operated on by an electrical discharge machine (EDM) which is now shown in simplified form in FIG. 23, which machine may be such as shown in U.S. Pat. No. 4,467,166 and sold by Fanuc Limited under the designation tape cut-Model LM or N. The electric discharge machine is used to form the cutting edge 45 of the die and the central opening 47. More specifically, the electric discharge machine uses reference holes 41 and the program described above in connection with FIGS. 1 and 4 to cut out the interior of the die blank along cutting edge 45. As shown in FIG. 16, the EDM has to cut only that portion of die blank 31 extending above groove 43. It does this at an angle labeled A in FIG. 7 of one degree with respect to the vertical (which vertical is parallel to the longitudinal axis of the die). Also illustrated in FIG. 17 is the angle B of the inclined outer surface of the die. This angle is preferably fifteen degrees, which is believed to be substantially greater than the inclines on conventional dies.

Figure 4B:
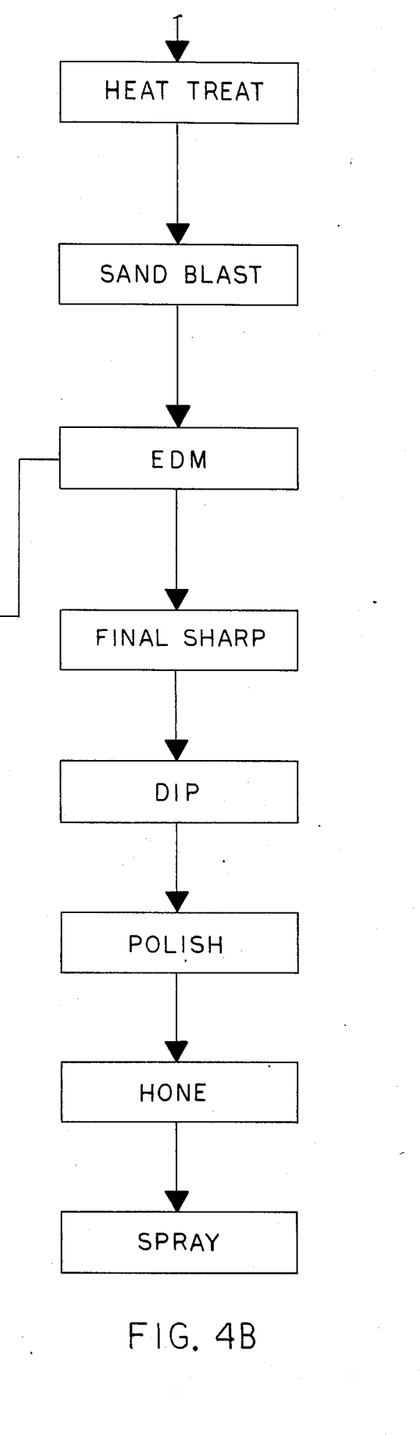

The die blank is then finally sharpened (FIG. 4B) by a honing stone if necessary. The cutting edge template 13 is used in this step to ensure accuracy. The blank is then dipped to prepare it for polishing and increase surface hardness and cutting life in a conventional manner. A beeswax polish is then applied, the blank is honed, and the entire die is then sprayed with a preservative, all in a conventional manner.

Figure 19:
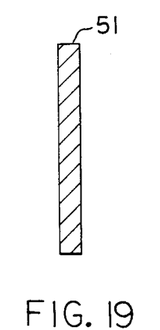
FIG. 19 is a section taken generally along line 19—19 of FIG. 18.
Figure 20:
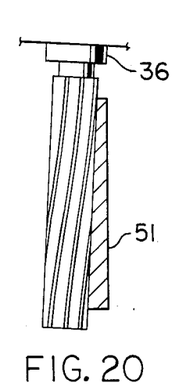
FIG. 20 is a view similar to FIG. 19 illustrating the outer surface of the die blank being milled.
Figure 21:
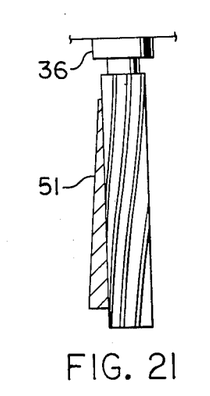
FIG. 21 is a view similar to FIG. 20 showing the inner surface of the envelope die blank being milled.
Figure 22:
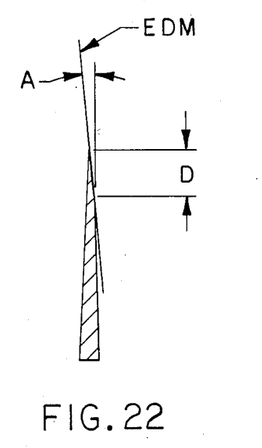
FIG. 22 is a view similar to FIG. 17 illustrating the geometry of the cutting surface of the envelope die of the present invention.

A second embodiment of the present invention is illustrated in FIGS. 18 through 22. This embodiment illustrates the making of an envelope die. An envelope die blank 51 (FIG. 8) is made in a manner very similar to that described above in connection with FIGS. 1 through 5. The one major difference, however, is that both the inside and the outside surfaces of die blank 51 are cut using flame cutting system 23. That is, the flame cutting procedure is used to cut the inside and outside walls of the envelope die. This cut part is then placed on a surface grinder and the top and bottom of the die are ground to a gross height and defined surface. The envelope which can be made from the envelope die is indicated in phantom as 53 in FIG. 8. Since both the inside and outside walls of envelope die blank 51 have been cut by the flame cutting system, a typical cross section is as indicated in FIG. 19. Die blank 51 is then placed in the numerically controlled mill governed by a program generated as described above. This program directs the milling of the inside and outside features, angles and rolls of the completed die. Such a process is indicated in FIG. 20 in which an outside angle of three degrees is being milled into die blank 51. Similarly, in FIG. 21 an angle of one degree with respect to the vertical is milled on the inside surface of blank 51. After milling the part is placed in the heat treating furnace and drawn to bring the hardness up to a desired level and the part is then sandblasted to remove excess heat treatment crust. Thereafter, an electric discharge machine such as described above is used to put the final cutting edge on the part. Specifically, an angle of five degrees (labeled A in FIG. 22) is cut into the top of blank 51, which angle extends a predetermined distance labeled D down from the top of the die blank. This operation again is controlled by the program generated by the computer as discussed above. In the milling and electric discharge machining processes described in connection with FIGS. 20 through 22, the machine use as a reference the straight line labeled 55 along the lower part of die blank 51. After the cutting edge is put on using the electric discharge machine, the envelope die is finished in generally the same manner as described above in connection with the label die.

Portions of an electric discharge machine such as disclosed in U.S. Pat. No. 4,467,166 are shown in FIG. 23 putting the cutting edge labelled 56, on envelope die blank 51. Blank 51 is held securely by four posts 57 or any other suitable securing arrangement with respect to a table 59 of the electric discharge machine. An electric discharge cutting wire 61 is fed through upper and lower guides 63 and 64 along the surface to be cut. Positioning of the wire to form cutting edge 56 is accomplished by transverse movement of upper guide 63 with respect to table 59. Of course, laser cutters or other similar cutters which cut metal without introducing significant strain could also be used to form the cutting surface of a die.

Since both the label and envelope dies are cut out of a single block of metal, they each form a continuous, seamless die. That is, they have no weld such as is necessary in previous dies to connect the two sides of the die together. These dies have no ends, but rather are continuous. This is believed to result in a die with significantly less internal strain and hence, longer life than dies made by the conventional method described above.

It is to be understood that while the cutting surface is described as being on the top of the wall of the die, the location is relative and refers to the position of the cutting surface during the process of manufacture of the die. When the dies are used in the envelope cutting process the die is usually, though not always, oriented so that the cutting surface and cutting edge, are at the bottom of the die.

In view of the above, it can be seen that the various aspects and features are achieved and other advantageous results obtained. While two preferred embodiments of the present invention have been described. It should be understood that various changes, adaptations, and modifications may be made therein without departing from the spirit of the invention and the scope of the appended claims.

I claim as my invention:

1. A method of making a die for repetitively cutting predetermined shapes out of paper, cloth and the like comprising the steps of:
    (a) cutting a die blank out of a blank of metal, the outline of the die blank corresponding generally to the shape it is desired to cut;
    (b) removing at least part of the interior of the die blank to form a modified die blank with a central opening having substantially the same shape as the shape it is desired to cut; and
    (c) forming a cutting edge on one surface of the modified die blank adjacent the central opening.

2. The method as set forth in claim 1 wherein:
    (d) the die blank is cut out of a blank of metal having a thickness generally corresponding to the desired height of the die.

3. The method as set forth in claim 1 wherein:
    (d) the die blank is flame cut out of the block of metal.

4. The method as set forth in claim 3 wherein:
    (e) at least part of the interior of the die blank is also removed by flame cutting.

5. The method as set forth in claim 1 wherein:
    (d) the step of removing at least part of the interior of the die blank includes milling out at least some of the interior of the blank.

6. The method as set forth in claim 5 wherein:
    (e) the cutting edge is formed at least in part by electrical discharge machining.

7. The method as set forth in claim 6 wherein:
    (f) the inner surface of the cutting edge is formed by electrical discharge machining.

8. The method as set forth in claim 1 wherein:
    (d) the outer surface of the die is inclined with respect to the longitudinal axis of the die.

9. The method as set forth in claim 8 wherein:
    (e) the inclined outer surface is first milled to form steps in the outer surface prependicular to the longitudinal axis of the die; and
    (f) then the stops are milled substantially smooth.

10. The method as set forth in claim 8 wherein:
    (e) the outer surface is machined at an angle substantially greater than eight degrees with respect to the longitudinal axis of the die.

11. The method as set forth in claim 10 wherein:
    (f) the outer surface is machined at an angle of approximately fifteen degrees.

12. The method as set forth in claim 1 wherein:
    (d) at least a portion of the interior of the die blank is removed by electrical discharge machining.

* * * * *

UNITED STATES PATENT AND TRADEMARK OFFICE
CERTIFICATE OF CORRECTION

PATENT NO.  :  4,625,592

DATED       :  December 12, 1986

INVENTOR(S) :  Harold J. Bayens

It is certified that error appears in the above-identified patent and that said Letters Patent is hereby corrected as shown below:

Column 2, line 32, delete "substantially" and insert --substantially--.

Column 3, line 5, delete "of".

Column 3, line 6, before "FIG. 13" at the beginning of the line insert --of--.

Column 5, line 47, delete "sides" and insert --ends--.

Column 6, line 48, delete "stops" and insert --steps--.

Signed and Sealed this

Sixteenth Day of May, 1989

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,625,592
DATED : December 2, 1986
INVENTOR(S) : Harold J. Bayens

It is certified that error appears in the above-identified patent and that said Letters Patent is hereby corrected as shown below:

Column 6, line 13, delete "blank" second occurence and insert --block--.

Column 6, line 23, delete "blank" second occurence and insert --block--.

Signed and Sealed this

Twelfth Day of December, 1989

Attest:

JEFFREY M. SAMUELS

Attesting Officer    Acting Commissioner of Patents and Trademarks